J. G. COBB.
Turpentine Tools.
No. 139,369. Patented May 27, 1873.
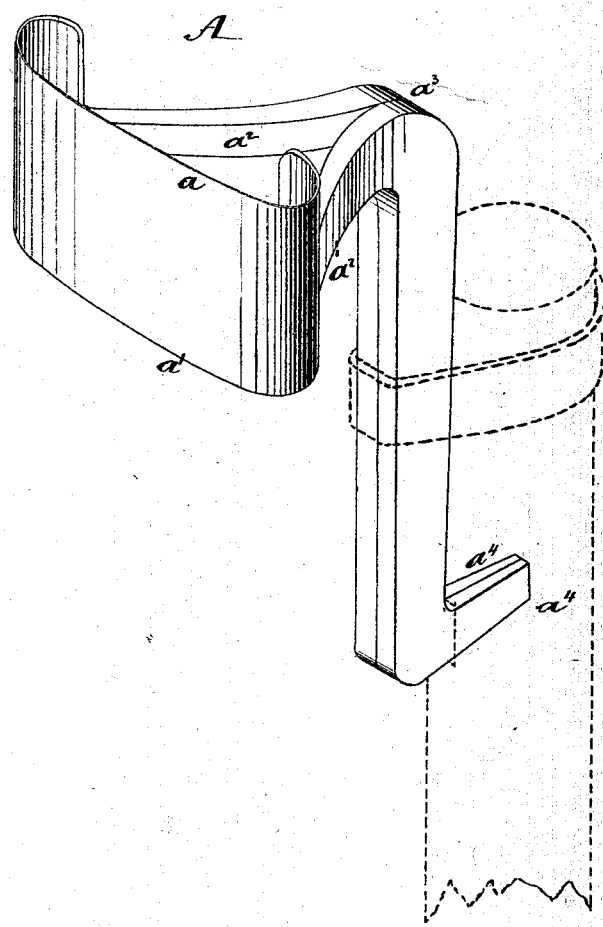

UNITED STATES PATENT OFFICE.

JOHN G. COBB, OF SHOE HEEL, NORTH CAROLINA.

IMPROVEMENT IN TURPENTINE-TOOLS.

Specification forming part of Letters Patent No. 139,369, dated May 27, 1873; application filed December 12, 1872.

*To all whom it may concern:*

Be it known that I, JOHN G. COBB, of Shoe Heel, in the county of Robeson and State of North Carolina, have invented a new and useful Improvement in Turpentine-Scrapers; and I do hereby declare the following to be a full, clear, and exact description of the same, reference being had to the accompanying drawing forming a part of this specification.

The invention relates to turpentine-scrapers, which are used to detach the resinous substance that exudes from the tree, and consists in a double-edged reversible scraper. This obviates entirely the employment of two implements to complete the operation.

The drawing represents a perspective view.

A in the drawing represents a turpentine-scraper provided with the two steel edges $a$ $a^1$ and the shanks $a^2$ $a^2$. The latter are brought together at the bend $a^3$, have right-angled ends $a^4$, and are welded together to form one piece, and provided with a turned end that fits conveniently into the handle. The handle is placed nearly parallel to the plane of the blade, so that the implement can be extended upward against the tree, to bring the inner edge $a$ at a slightly oblique angle to the surface thereof, and then drawn downward until the end of handle reaches the ground, or until it is inconvenient to draw further in that direction. The implement is then reversed, and the outer edge $a^1$ placed at a proper angle to surface of tree, when it is pushed downward until the desired limit is attained.

Hitherto the draw and push knife have been separate implements, one being laid aside when the other is taken up.

Having thus described my invention, what I claim as new, and desire to secure by Letters Patent, is—

The described double-edged reversible turpentine-scraper, provided with a handle arranged in a plane nearly parallel to that of the blade, as set forth.

J. G. COBB.

Witnesses:
   SOLON C. KEMON,
   CHAS. A. PETTIT.